US009786070B2

(12) United States Patent
Chen et al.

(10) Patent No.: US 9,786,070 B2
(45) Date of Patent: Oct. 10, 2017

(54) CT SYSTEM FOR SECURITY CHECK AND METHOD THEREOF

(71) Applicant: Nuctech Company Limited, Beijing (CN)

(72) Inventors: Zhiqiang Chen, Beijing (CN); Li Zhang, Beijing (CN); Shuo Wang, Beijing (CN); Yunda Sun, Beijing (CN); Qingping Huang, Beijing (CN); Zhi Tang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 14/748,383

(22) Filed: Jun. 24, 2015

(65) Prior Publication Data

US 2016/0012647 A1 Jan. 14, 2016

(30) Foreign Application Priority Data

Jun. 25, 2014 (CN) .......................... 2014 1 0290133

(51) Int. Cl.
*G06K 9/00* (2006.01)
*G06T 11/20* (2006.01)
(Continued)

(52) U.S. Cl.
CPC ............ *G06T 11/20* (2013.01); *G01V 5/0008* (2013.01); *G06K 9/46* (2013.01); *G06K 9/52* (2013.01);
(Continued)

(58) Field of Classification Search
USPC .................................. 382/128–134, 181–231
See application file for complete search history.

(56) References Cited

U.S. PATENT DOCUMENTS 8,478,016 B2 7/2013 Robinson
9,058,658 B2 6/2015 Li et al.
(Continued)

FOREIGN PATENT DOCUMENTS

CA 2692139 A1 1/2009
CN 101943761 A 1/2011
(Continued)

OTHER PUBLICATIONS

Megherbi, et al "Fully Automatic 3D Threat Image Projection: Application to Densely Cluttered 3D Computed Tomography Baggage Images" Image Processing Theory, Tools and Applications. 1-7 (2012).
(Continued)

*Primary Examiner* — Alex Liew
(74) *Attorney, Agent, or Firm* — Browdy and Neimark, P.L.L.C.

(57) ABSTRACT

A CT system for security check and a method thereof are provided. The method includes: reading inspection data of an inspected object; inserting at least one three-dimensional (3D) Fictional Threat Image (FTI) into a 3D inspection image of the inspected object, which is obtained from the inspection data; receiving a selection of at least one region in the 3D inspection image including the 3D FTI or at least one region in a two-dimensional (2D) inspection image including a 2D FTI corresponding to the 3D FTI, wherein the 2D inspection image is obtained from the 3D inspection image or is obtained from the inspection data; and providing a feedback of the 3D inspection image including at least one 3D FTI in response to the selection. With the above solution, it is convenient for a user to rapidly mark a suspected object in the CT image, and provides a feedback of whether a FTI is included.

16 Claims, 10 Drawing Sheets

(51) Int. Cl.
  *G06K 9/46*  (2006.01)
  *G06T 15/20*  (2011.01)
  *G06K 9/52*  (2006.01)
  *G06T 7/60*  (2017.01)
  *G06K 9/62*  (2006.01)
  *G01V 5/00*  (2006.01)
  *G06T 7/73*  (2017.01)
  *G06T 7/50*  (2017.01)

(52) U.S. Cl.
  CPC .............. *G06K 9/6218* (2013.01); *G06T 7/50* (2017.01); *G06T 7/60* (2013.01); *G06T 7/75* (2017.01); *G06T 15/20* (2013.01); *G06K 2009/4666* (2013.01)

(56) References Cited

U.S. PATENT DOCUMENTS

| | | | | |
|---|---|---|---|---|
| 2005/0281464 | A1* | 12/2005 | Kaku | G06K 9/00228 382/173 |
| 2008/0175456 | A1* | 7/2008 | Ioannou | G01T 1/1647 382/131 |
| 2008/0253653 | A1* | 10/2008 | Gable | G01V 5/0008 382/173 |
| 2010/0046704 | A1 | 2/2010 | Song et al. | |
| 2014/0185923 | A1 | 7/2014 | Chen | |

FOREIGN PATENT DOCUMENTS

| | | |
|---|---|---|
| CN | 102224413 | 10/2011 |
| CN | 102567960 A | 7/2012 |
| CN | 103713329 A | 4/2014 |
| CN | 103900503 A | 7/2014 |
| CN | 103901489 A | 7/2014 |
| GB | 2510255 | 7/2014 |
| JP | 2007203040 A | 8/2007 |
| JP | 2008515466 A | 5/2008 |
| JP | 2010060572 A | 3/2010 |
| JP | 2010230532 | 10/2010 |
| JP | 2010230676 | 10/2010 |
| JP | 2013546040 A | 12/2013 |
| JP | 2014064957 | 4/2014 |
| JP | 2014508954 A | 4/2014 |

OTHER PUBLICATIONS

Yildiz et al " 3-D Threat Image Projection" Three-Dimensional Image Capture and Application. XP002625062 1-8 (2008).
Rusu et al "Close-range Scene Segmentation and Reconstruction of 3D Point Cloud Maps for Mobile Manipulation in Domestic Environments" International Conference on Intelligent Robots and Systems. 1-6 (2009).
Partial European Search Report, issued Nov. 20, 2015 in corresponding application No. 15173714.5.
International Search Report, dated Sep. 21, 2015. In corresponding application No. PCTC/N2015/082202.
International Search Report, dated Jun. 6, 2015 in corresponding application No. PCT/CN2015/082202.

* cited by examiner

CT SYSTEM FOR SECURITY CHECK AND METHOD THEREOF

CROSS-REFERENCE TO RELATED APPLICATION(S)

This application claims priority to Chinese Application No. 201410290133.7, filed on Jun. 25, 2014, entitled "CT SYSTEM FOR SECURITY CHECK AND METHOD THEREOF," which is incorporated herein by reference in its entirety.

TECHNICAL FIELD

The present disclosure relates to the security check, and in particular, to a Computed Tomography (CT) system for security check and a method thereof.

BACKGROUND

Multi-energy X-ray security check systems belong to a new type of security check system developed on the basis of single-energy X-ray security check systems. The multi-energy X-ray security check system can provide not only the shape and contents of an inspected object, but also information reflecting an equivalent atomic number of the inspected object, so as to identify whether the inspected object is an organic matter or an inorganic matter, and display the inspected object on a color monitor in different colors, for convenience of recognition by an operator.

In the field of security check, Threat Image Projection (TIP) is an important demand. The so-called TIP refers to that threat images which are previously collected are inserted into an image of, e.g., luggage or parcel, that is, Fictional Threat Images (FTIs) are inserted. This plays an important role in the training of security check inspectors and evaluation of working efficiency of the inspectors. As for two-dimensional (2D) TIPs for the X-ray security check systems, there have been mature solutions and a variety of applications. However, as for three-dimensional (3D) TIPs for security check CTs, there is currently no manufacturer to provide such functionality.

SUMMARY

In consideration of one or more technical problems in the related art, the present disclosure proposes a CT system for security check and a method thereof, by which it is possible for a user to rapidly mark a suspected object in a CT image and to provide a feedback of whether a FTI image is included.

According to an aspect of the present disclosure, there is provided a method in a Computed Tomography (CT) system for security check, comprising steps of: reading inspection data of an inspected object; inserting at least one three-dimensional (3D) Fictional Threat Image (FTI) into a 3D inspection image of the inspected object, wherein the 3D inspection image is obtained from the inspection data; receiving a selection of at least one region in the 3D inspection image including the 3D FTI or at least one region in a two-dimensional (2D) inspection image including a 2D FTI corresponding to the 3D FTI, wherein the 2D inspection image is obtained from the 3D inspection image or is obtained from the inspection data; and providing a feedback of the 3D inspection image including at least one 3D FTI in response to the selection.

According to some embodiments, the step of receiving a selection of at least one region in the 3D inspection image including the 3D FTI or at least one region in a 2D inspection image including a 2D FTI corresponding to the 3D FTI comprises: receiving coordinate positions of a part of the 3D inspection image or the 2D inspection image associated with the selection.

According to some embodiments, the step of providing a feedback of the 3D inspection image including at least one 3D FTI in response to the selection comprises at least one of: judging whether the at least one selected region includes the at least one 3D FTI; popping up a dialog to confirm that the 3D inspection image includes at least one 3D FTI; providing text indication on an interface to confirm that the 3D inspection image includes at least one 3D FTI; highlighting the part of the 3D inspection image or the 2D inspection image associated with the selection; marking the part of the 3D inspection image or the 2D inspection image associated with the selection; and filling the part of the 3D inspection image or the 2D inspection image associated with the selection with a particular color or pattern.

According to some embodiments, at least one spatial characteristic parameter of the inspected object is calculated according to the inspection data, and at least one 3D FTI is inserted into the 3D inspection image of the inspected object based on the spatial characteristic parameter.

According to some embodiments, the spatial characteristic parameter is related to at least one of position, size and orientation of the 3D FTI to be inserted.

According to some embodiments, selection of at least one region comprises selection of a part of the displayed 3D inspection image at an angle of view.

According to some embodiments, in 3D rendering of the 3D inspection image, point cloud information characterizing the inspected object is recorded, and the step of providing a feedback of the 3D inspection image including at least one 3D FTI in response to the selection comprises: obtaining a sequence of point cloud information clusters of different objects in the inspected object by division; determining at least one selected region from the sequence of point cloud information clusters of the different objects based on a predetermined criterion; and judging whether the at least one selected region includes the at least one 3D FTI.

According to some embodiments, selection of at least one region comprises selection of a part of the displayed 3D inspection image at multiple angles of view.

According to some embodiments, selection of at least one region comprises selection of a part of the displayed 3D inspection image at two different angles of view, wherein the two different angles of view are substantially orthogonal to each other, transparent regions are removed from the inspection data to obtain a hierarchical bounding box of opaque regions in the inspection data, and then a scene depth is rendered for the hierarchical bounding box to obtain a depth map on the front side and a depth map on the back side, and the step of providing a feedback of the 3D inspection image including at least one 3D FTI in response to the selection comprises: performing retrieval in the depth map on the front side and the depth map on the back side respectively according to a region selected by a user at a first angle of view to generate a first bounding box; performing ray casting with the generated first bounding box as a texture carrier; performing retrieval in the depth map on the front side and the depth map on the back side respectively according to a region selected by the user at a second angle of view substantially orthogonal to the first angle of view, to generate a second bounding box; performing a Boolean intersection operation on the first bounding box and the second bounding box in an image space, to obtain a marked region in a 3D space as at least one selected region; and judging whether the at least one selected region includes the at least one 3D FTI.

According to some embodiments, the step of inserting at least one 3D FTI into a 3D inspection image of the inspected object comprises: dividing the 3D inspection image to obtain multiple 3D sub-images of the inspected object; calculating distances between and positions of the multiple 3D sub-images; and inserting the 3D FTI based on the calculated distances and positions.

According to some embodiments, the step of inserting at least one 3D FTI into a 3D inspection image of the inspected object comprises: determining transparent parts and opaque parts in volume data of the inspected object based on opacity values of voxels; determining positions and sizes of cases of the inspected object from the opaque parts of the volume data; determining candidate insertion positions in transparent regions in the range of the cases; and selecting at least one position from the candidate insertion positions according to a predetermined criterion to insert at least one 3D FTI into the at least one selected position.

According to some embodiments, the step of inserting at least one 3D FTI into a 3D inspection image of the inspected object comprises: removing a background image from the 2D inspection image, to obtain a 2D foreground image; determining a 2D insertion position of a 2D FTI in the 2D foreground image; determining a position of a 3D FTI in the 3D inspection image along a depth direction at the 2D insertion position; and inserting at least one 3D FTI into the determined position.

According to some embodiments, the method further comprises: inserting a 2D FTI corresponding to the at least one 3D FTI into the 2D inspection image of the inspected object.

According to a further aspect of the present disclosure, there is provided a Computed Tomography (CT) system for security check, comprising: a CT scanning device configured to obtain inspection data of an inspected object; a storage configured to store the inspection data; a display device configured to display a three-dimensional (3D) inspection image and/or two-dimensional (2D) inspection image of the inspected object, wherein the 3D inspection image is obtained from the inspection data, and the 2D inspection image is obtained from the 3D inspection image or the inspection data; a data processor configured to insert at least one 3D Fictional Threat Image (FTI) into the 3D inspection image of the inspected object; and an input device configured to receive a selection of at least one region in the 3D inspection image including the 3D FTI or at least one region in the 2D inspection image including a 2D FTI corresponding to the 3D FTI, wherein the data processor is further configured to provide a feedback of the 3D inspection image including at least one 3D FTI in response to the selection According to some embodiments, the data processor is further configured to calculate at least one spatial characteristic parameter of the inspected object according to the inspection data, and insert at least one 3D FTI into the 3D inspection image of the inspected object based on the spatial characteristic parameter.

According to some embodiments, the spatial characteristic parameter is related to at least one of position, size and orientation of the 3D FTI to be inserted.

According to a further aspect of the present disclosure, there is provided a method for marking a suspected object in a CT system for security check, comprising steps of: removing transparent regions from CT data obtained by the CT system for security check to obtain a hierarchical bounding box of opaque regions in the CT data; rendering a scene depth for the hierarchical bounding box to obtain a depth map on the front side and a depth map on the back side; performing retrieval in the depth map on the front side and the depth map on the back side respectively using marks made by a user along the line of sight direction, to generate a first bounding box; performing ray casting with the generated first bounding box as a texture carrier; performing retrieval in the depth map on the front side and the depth map on the back side respectively using marks made by the user along a direction orthogonal to the line of sight direction, to generate a second bounding box; performing a Boolean intersection operation on the first bounding box and the second bounding box in an image space to obtain a marked region in a 3D space; and displaying the marked region in the 3D space in combination with the CT data.

According to some embodiments, the step of removing transparent regions comprises: sampling the CT data along the line-of-sight direction; performing volume rendering integration on a segment between each two sampling points using a lookup table for pre-integration based on opacity, to obtain opaqueness corresponding to the segment; and removing the transparent regions by subdivision using an octree encoding algorithm, to obtain a hierarchical bounding box corresponding to the opaque data regions.

According to some embodiments, the step of rendering a scene depth comprises: removing a section with a relatively great depth value to obtain the depth map on the front side; and removing a section with a relatively small depth value to obtain the depth map on the back side.

According to some embodiments, the first bounding box and the second bounding box are bounding boxes along any direction.

According to some embodiments, the marked region in the 3D space is displayed in combination with the CT data using a space constraint based transfer function.

According to a further aspect of the present disclosure, there is provided an apparatus for marking a suspected object in a CT system for security check, comprising: means for removing transparent regions from CT data obtained by the CT system for security check to obtain a hierarchical bounding box of opaque regions in the CT data; means for rendering a scene depth for the hierarchical bounding box to obtain a depth map on the front side and a depth map on the back side; means for performing retrieval in the depth map on the front side and the depth map on the back side respectively using marks made by a user along the line of sight direction, to generate a first bounding box; means for performing ray casting with the generated first bounding box as a texture carrier; means for performing retrieval in the depth map on the front side and the depth map on the back side respectively using marks made by a user along a direction orthogonal to the line of sight direction, to generate a second bounding box; means for performing a Boolean intersection operation on the first bounding box and the second bounding box in an image space to obtain a marked region in a 3D space; and means for displaying the marked region in the 3D space in combination with the CT data.

According to some embodiments, the means for removing transparent regions comprises: means for sampling the CT data along the line-of-sight direction; means for performing volume rendering integration on a segment between each two sampling points using a lookup table method, to obtain opaqueness corresponding to the segment; and means for removing the transparent regions by subdivision using an octree encoding algorithm, to obtain a hierarchical bounding box.

According to some embodiments, the means for rendering a scene depth comprises: means for removing a section with a relatively great depth value to obtain the depth map on the front side; and means for removing a section with a relatively small depth value to obtain the depth map on the back side.

With the above technical solution, it is convenient for a user to rapidly mark a suspected object in the CT image, and provides a feedback of whether a FTI is included.

BRIEF DESCRIPTION OF THE DRAWINGS

For better understanding the present disclosure, the present disclosure will be described in detail according to the accompanying drawings, in which.

DETAILED DESCRIPTION

Specific embodiments of the present disclosure will be described in detail below. It should be noted that the embodiments described herein are provided for illustration only, without limiting the present disclosure. In the description below, a number of specific details are explained to provide better understanding of the present disclosure. However, it is apparent to those skilled in the art that the present disclosure can be implemented without these specific details. In other instances, well known structures, materials or methods are not described in detail so as not to obscure the concept of the present disclosure.

Throughout the specification, the reference to "one embodiment," "an embodiment," "one example" or "an example" means that specific features, structures or properties described in conjunction with the embodiment or example are included in at least one embodiment of the present disclosure. Therefore, the phrases "in one embodiment," "in an embodiment," "in one example" or "in an example" in various positions throughout the specification may not necessarily refer to the same embodiment or example. Furthermore, the specific features, structures or properties may be embodied in one or more embodiments or examples in any appropriate combination and/or sub-combination. Moreover, it should be understood by those skilled in the art that the term "and/or" used herein means any and all combinations of one or more listed items.

With respect to the incapability of rapidly inserting 3D FTIs in the related art, according to embodiments of the present disclosure, inspection data of an inspected object is read. At least one 3D FTI is inserted into a 3D inspection image of the inspected object, wherein the 3D inspection image is obtained from the inspection data. A selection of at least one region in the 3D inspection image including the 3D FTI or at least one region in a 2D inspection image including a 2D FTI corresponding to the 3D FTI is received, wherein the 2D inspection image is obtained from the 3D inspection image or is obtained from the inspection data. A feedback of the 3D inspection image including at least one 3D FTI is provided in response to the selection. With the above solution, it is convenient for a user to rapidly mark a suspected object in the CT image, and provides a feedback of whether a FTI is included.

Figure 1:
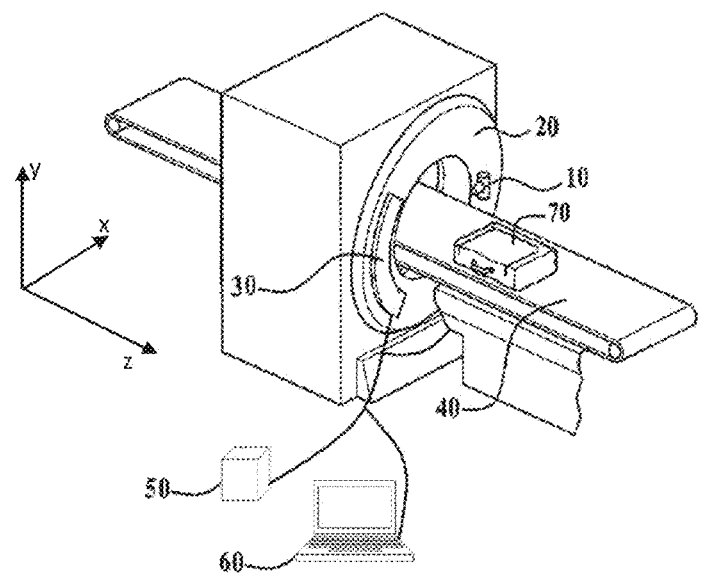
FIG. 1 is a structural diagram schematically illustrating a CT system for security check according to an embodiment of the present disclosure.

FIG. 1 is a structural diagram schematically illustrating a CT system according to an embodiment of the present disclosure. As shown in FIG. 1, the CT device according to the present embodiment comprises a rack 20, a carrying member 40, a controller 50, a computer data processor 60 or the like. The rack 20 comprises a ray source 10 to emit X-ray for inspection, such as an X-ray emitter, and a detection and collection device 30. The carrying member 40 carries an inspected luggage 70 to pass through a scan area between the ray source 10 and the detection and collection device 30 of the rack 20, while the rack 20 rotates around the moving direction of the inspected luggage 70. In this way, the ray emitted from the ray source 10 can transmit through the inspected luggage 70 to implement CT scanning on the inspected luggage 70.

The detection and collection device 30 is, for example, an integral module with a detector and a data collector integrated therein, such as a flat panel detector, to detect rays transmitting through the inspected object to obtain an analog signal, and convert the analog signal into a digital signal, so as to output projection data of the inspected luggage 70 with respect to the X ray. The controller 50 is configured to control various parts of the whole system to operate cooperatively. The computer data processor 60 is configured to process the data collected by the data collector, reconstruct the data, and output a result.

As shown in FIG. 1, the ray source 10 is placed on one side of the inspected object, and the detection and collection device 30 (including the detector and the data collector) is placed on the other side of the inspected luggage 70, to obtain multi-angle projection data of the inspected luggage 70. The data collector comprises a data amplification and shaping circuit, which may operate in a (electrical current) integration manner or a pulse (counting) manner. The detection and collection device 30 has a data output cable connected to the controller 50 and the computer data processor 60, to store the collected data in the computer data processor 60 according to a trigger command.

Figure 2:
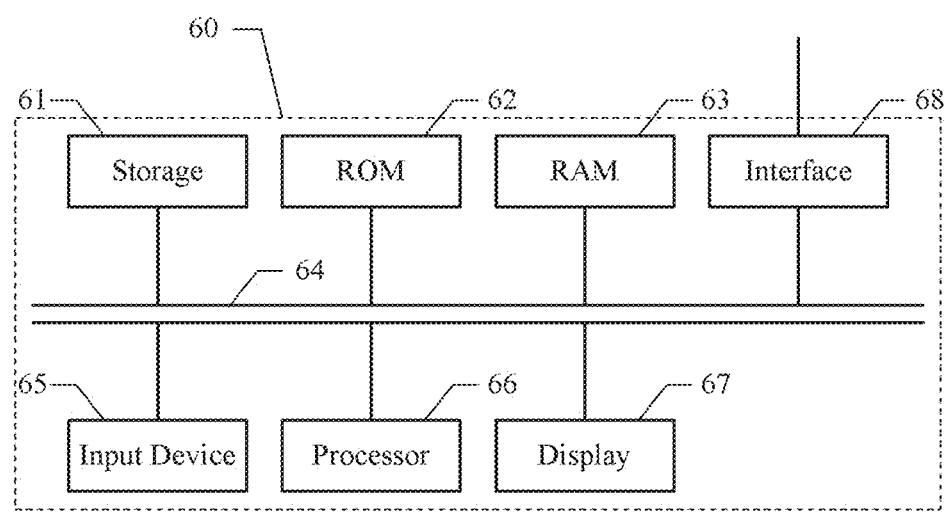
FIG. 2 is a structural block diagram illustrating a computer data processor shown in FIG. 1.

FIG. 2 is a structural block diagram illustrating the computer data processor 60 shown in FIG. 1. As shown in FIG. 2, the data collected by the data collector is stored in a storage 61 through an interface unit 68 and a bus 64. A Read-Only Memory (ROM) 62 has configuration information and programs of the computer data processor stored therein. A Random-Access Memory (RAM) 63 is configured to temporarily store various data in the operation of a processor 66. In addition, the storage 61 also has a computer program for data processing stored therein. The internal bus 64 is configured to connect the storage 61, the ROM 62, the RAM 63, an input device 65, the processor 66, a display device 67, and the interface unit 68 as described above.

After the user inputs an operation command through the input device 65 such as a keyboard, a mouse or the like, instruction codes of the computer program command the processor 66 to execute a predetermined data processing algorithm, and after obtaining a data processing result, display the result on the display device 67 such as a Liquid Crystal Display (LCD) display or the like, or directly output the processing result in a hard copy such as printing.

Figure 3:
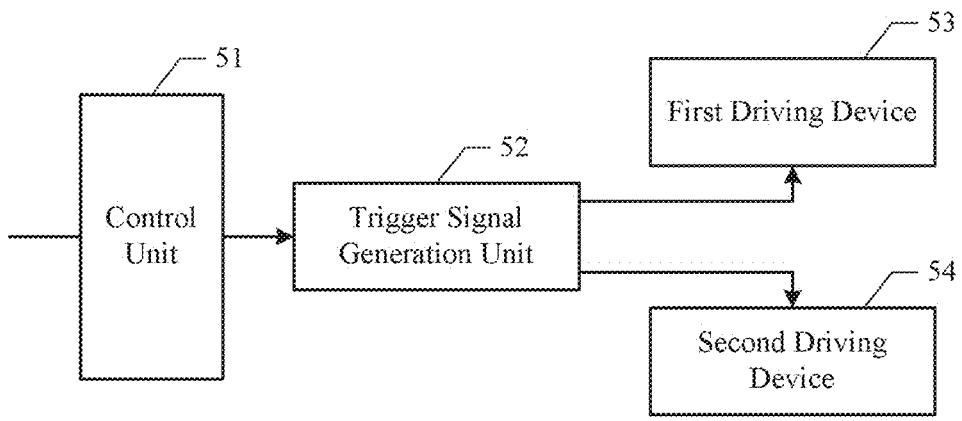
FIG. 3 is a structural block diagram illustrating a controller according to an embodiment of the present disclosure.

FIG. 3 is a structural block diagram showing the controller according to an embodiment of the present disclosure. As shown in FIG. 3, the controller 50 comprises a control unit 51 configured to control the ray source 10, the carrying member 40 and the detection and collection device 30 according to instructions from the computer 60; a trigger signal generation unit 52 configured to generate a trigger command for triggering the ray source 10, the detection and collection device 30 and the carrying member 40 to act under the control of the control unit; a first driving device 53 configured to drive the carrying member 40 to transfer the inspected luggage 70 according to the trigger command generated by the trigger signal generation unit 52 under the control of the control unit 51; and a second driving device 54 configured to drive the rack 20 to rotate according to the trigger command generated by the trigger signal generation unit 52 under the control of the control unit 51. The projection data obtained by the detection and collection device 30 is stored in the computer 60 for reconstruction of CT tomographic images, so as to obtain data of the tomographic images of the inspected luggage 70. Then, the computer 60 obtains a DR image of the inspected luggage 70 in at least an angle of view from the data of the tomographic images by executing software, and displays the DR image together with the reconstructed three-dimensional image, for convenience of security check by an image recognizer. According to other embodiments, the above CT imaging system may be a dual-energy CT system, that is, the X ray source 10 of the rack 20 can emit two types of rays, i.e., at high-energy and low-energy. After the detection and collection device 30 detects projection data at different energy levels, the computer data processor 60 implements dual-energy CT reconstruction, to obtain equivalent atomic numbers and electron density data of various tomographic images of the inspected luggage 70.

Figure 4A:
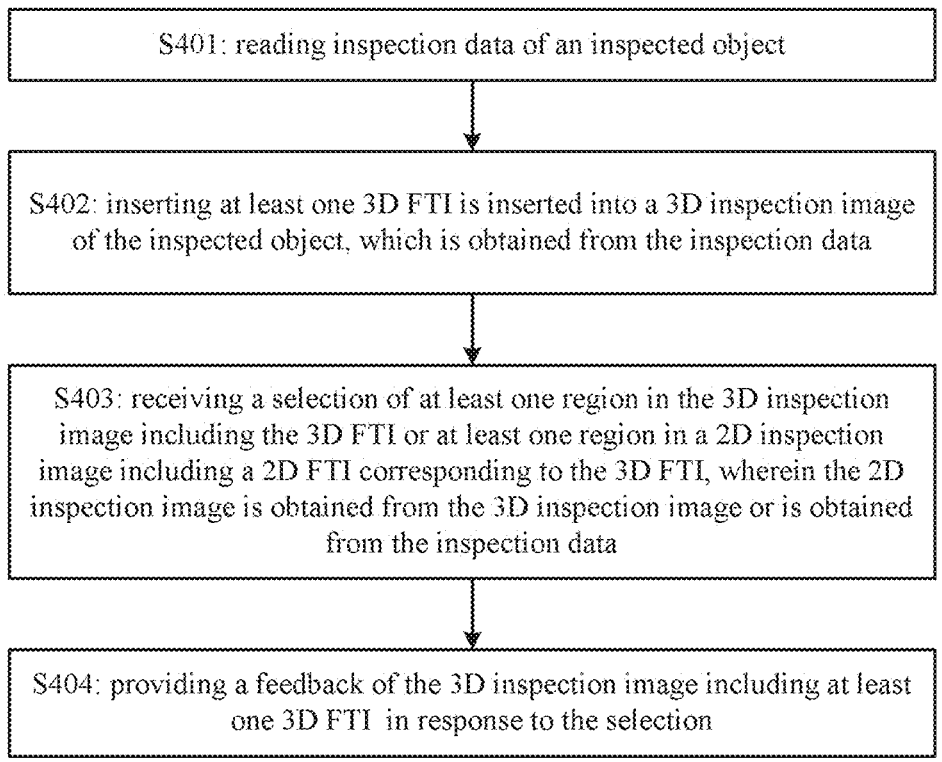
FIG. 4A is a flowchart illustrating a method in a security check system according to an embodiment of the present disclosure.

FIG. 4A is a flowchart illustrating a method in a security check system according to an embodiment of the present disclosure.

As shown in FIG. 4A, in step S401, inspection data of an inspected object is read.

In step S402, at least one 3D FTI is inserted into a 3D inspection image of the inspected object, wherein the 3D inspection image is obtained from the inspection data. For example, the data processor selects one or more 3D images from a FTI database and inserts the one or more 3D images into the 3D inspection image of the inspected object.

In step S403, a selection of at least one region in the 3D inspection image including the 3D FTI or at least one region in a 2D inspection image including a 2D FTI corresponding to the 3D FTI is received, wherein the 2D inspection image is obtained from the 3D inspection image or is obtained from the inspection data. For example, the user operates the input device to click on a check box to select a certain region or draws a circle to include a certain region in an image displayed on a screen.

In step S404, a feedback of the 3D inspection image including at least one 3D FTI is provided in response to the selection.

In some embodiments, the step of receiving a selection of at least one region in the 3D inspection image including the 3D FTI or at least one region in a 2D inspection image including a 2D FTI corresponding to the 3D FTI comprises: receiving coordinate positions of a part of the 3D inspection image or the 2D inspection image associated with the selection.

In some embodiments, the step of providing a feedback of the 3D inspection image including at least one 3D FTI in response to the selection comprises at least one of:
- judging whether the at least one selected region includes the at least one 3D FTI;
- popping up a dialog to confirm that the 3D inspection image includes at least one 3D FTI;
- providing text indication on an interface to confirm that the 3D inspection image includes at least one 3D FTI;
- highlighting the part of the 3D inspection image or the 2D inspection image associated with the selection;
- marking the part of the 3D inspection image or the 2D inspection image associated with the selection; and
- filling the part of the 3D inspection image or the 2D inspection image associated with the selection with a particular color or pattern.

For example, at least one spatial characteristic parameter of the inspected object is calculated according to the inspection data, and at least one 3D FTI is inserted into the 3D inspection image of the inspected object based on the spatial characteristic parameter. In some embodiments, the spatial characteristic parameter is related to at least one of position, size and orientation of the 3D FTI to be inserted. In addition, selection of at least one region comprises selection of a part of the displayed 3D inspection image at an angle of view.

For example, in 3D rendering of the 3D inspection image, point cloud information characterizing the inspected object is recorded, and the step of providing a feedback of the 3D inspection image including at least one 3D FTI in response to the selection comprises: obtaining a sequence of point cloud information clusters of different objects in the inspected object by division; determining at least one selected region from the sequence of point cloud information clusters of the different objects based on a predetermined criterion; and judging whether the at least one selected region includes the at least one 3D FTI.

In other embodiments, selection of at least one region comprises selection of a part of the displayed 3D inspection image at multiple angles of view. For example, selection of at least one region comprises selection of a part of the displayed 3D inspection image at two different angles of view, wherein the two different angles of view are substantially orthogonal to each other. Here, transparent regions are removed from the inspection data to obtain a hierarchical bounding box of opaque regions in the inspection data, and then a scene depth is rendered for the hierarchical bounding box to obtain a depth map on the front side and a depth map on the back side. The step of providing a feedback of the 3D inspection image including at least one 3D FTI in response to the selection comprises: performing retrieval in the depth map on the front side and the depth map on the back side respectively according to a region selected by the user at a first angle of view to generate a first bounding box; performing ray casting with the generated first bounding box as a texture carrier; performing retrieval in the depth map on the front side and he depth map on the back side respectively according to a region selected by the user at a second angle of view substantially orthogonal to the first angle of view, to generate a second bounding box; performing a Boolean intersection operation on the first bounding box and the second bounding box in an image space, to obtain a marked region in the 3D space as at least one selected region; and judging whether the at least one selected region includes the at least one 3D FTI.

In some embodiments, the step of inserting at least one 3D FTI into a 3D inspection image of the inspected object comprises: dividing the 3D inspection image to obtain multiple 3D sub-images of the inspected object; calculating distances between and positions of the multiple 3D sub-images; and inserting the 3D FTI based on the calculated distances and positions.

In other embodiments, the step of inserting at least one 3D FTI into a 3D inspection image of the inspected object comprises: determining transparent parts and opaque parts in volume data of the inspected object based on opacity values of voxels; determining positions and sizes of cases of the inspected object from the opaque parts of the volume data; determining candidate insertion positions in transparent regions in the range of the cases; and selecting at least one position from the candidate insertion positions as at least one selected region according to a predetermined criterion; and judging whether the at least one selected region includes the at least one 3D FTI.

In other embodiments, the step of inserting at least one 3D FTI into a 3D inspection image of the inspected object comprises: removing a background image from the 2D inspection image, to obtain a 2D foreground image; determining a 2D insertion position of a 2D FTI in the 2D foreground image; determining a position of a 3D FTI in the 3D inspection image along a depth direction at the 2D insertion position; and inserting at least one 3D FTI at the determined position.

The 3D FTIs are inserted as described above, but in some embodiments of the present disclosure, a 2D FTI corresponding to the at least one 3D FTI may be inserted into the 2D inspection image of the inspected object.

In addition, with respect to the problem in the related art, some embodiments of the present disclosure propose a technology of rapidly marking a suspected object. After transparent regions are removed from the data, new incident and emergent positions of a cast ray are obtained, and are recorded as a depth map. On basis of this, depth information of the 2D mark in the voxel space is restored. A Boolean intersection operation is performed on two obtained geometries in the image space, to finally obtain a marked region in the 3D space.

For example, in some embodiments, transparent regions are firstly removed, to rapidly obtain a compact hierarchical bounding box of opaque regions in the data, and then the hierarchical bounding box generated above is rendered to obtain a depth map on the front side and a depth map on the back side, which are the adjusted incident and emergent positions of the cast ray. Next, first pickup is performed along a current line-of-sight direction, and retrieval is performed in the depth maps on the front side and the back side using columns of marked points, to generate a bounding box such as an OBB bounding box. Then, the range of ray casting is updated according to the OBB bounding box generated above, and second pickup is performed at an orthogonal angle of view to which is automatically rotated from the current angle of view, to generate a new OBB bounding box. A Boolean intersection operation is performed on the OBB bounding boxes which are obtained in the previous two steps in the image space, to obtain a final marked region. Finally, the suspected region is displayed in combination with the original data using a space constraint based transfer function. With the marking method disclosed herein, the transparent regions can be rapidly and accurately removed from the CT data, which enables the user to rapidly complete the task of marking a suspected region in a friendly manner.

Figure 4B:
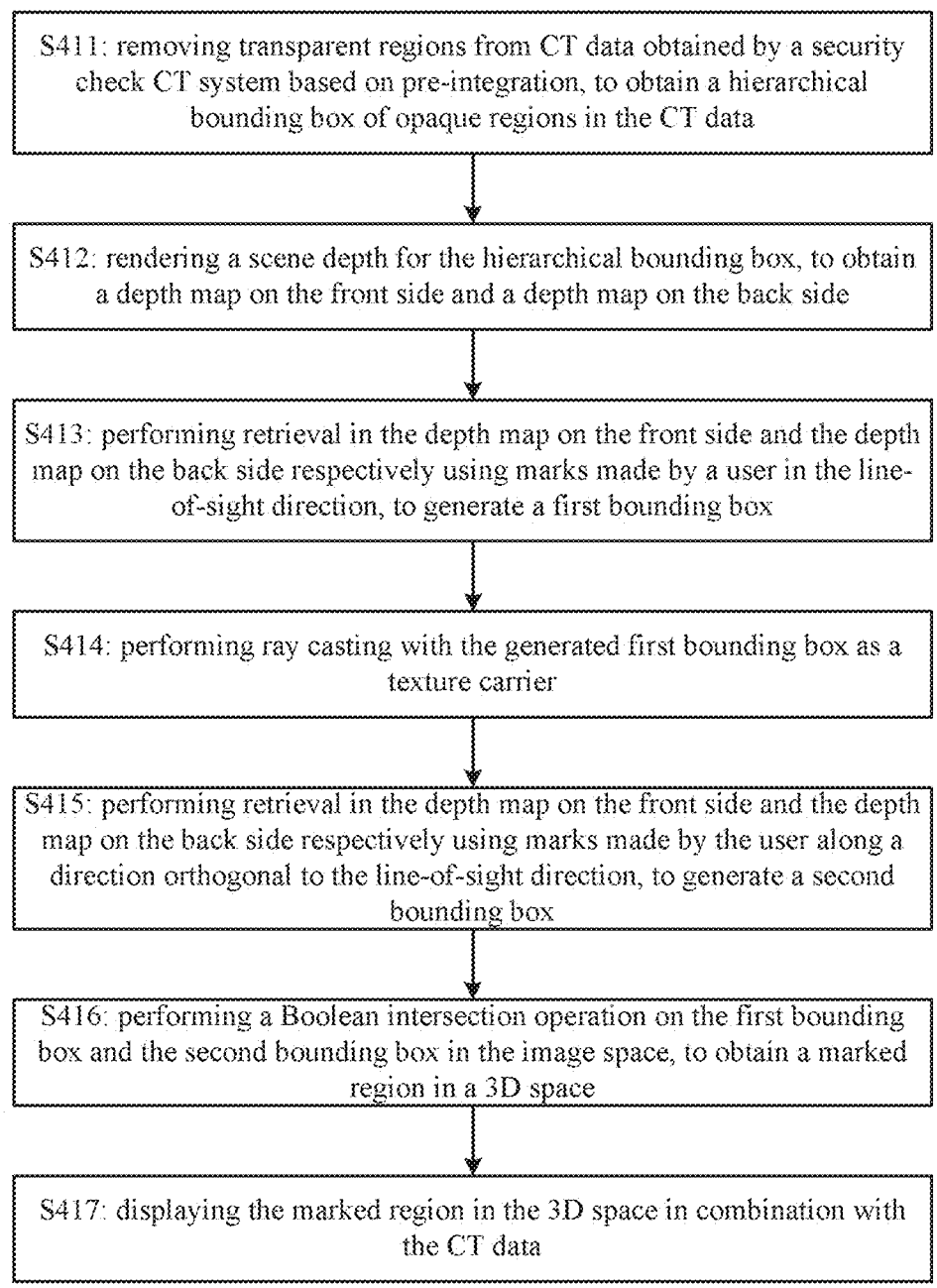
FIG. 4B is a flowchart illustrating a method for marking a suspected object in a CT system according to an embodiment of the present disclosure.

FIG. 4B is a flowchart illustrating a method for marking a suspected object in a CT system according to an embodiment of the present disclosure. After a CT device obtains CT data, transparent regions are firstly removed from the CT data. After the transparent regions are rapidly removed from the data, new incident and emergent positions of the ray are recorded as a depth map. In the pickup process, depth information of 2D marks in the voxel space is restored by querying the depth information in the depth map according to the 2D marks, and a Boolean intersection operation is performed on two obtained geometries in the image space to finally obtain a marked region in the 3D space.

In step S411, transparent regions are removed from the CT data obtained by the security check CT system based on pre-integration, to obtain a hierarchical bounding box of opaque regions in the CT data.

1) Generation of Lookup Table for Pre-Integration Based on Opacity

A 3D data field processed by volume rendering comprises discrete data defined in a 3D space, and the whole data field is represented by a discrete 3D matrix. Each small box in the 3D space represents a scalar value, called voxel. In practical calculation, the voxel may act as a sampling point in the 3D data field, and a sampled scalar value is s. For the data field s(x), it needs to firstly classify the volume data to specify colors and attenuation coefficients. The intensity s of the volume data is mapped into a color I(s) and an attenuation coefficient $\tau(s)$ by introducing a transfer function. In an instance, the transfer function is decided by both the gray level data and the material data from the dual-energy CT, and is also referred to as a 2D color table.

In the volume rendering, when the 3D scalar field s(x) is sampled, a Nyquist sampling frequency of the opacity function τ(s(x)) is equal to a maximal Nyquist sampling frequency of τ(s) multiplied by a Nyquist sampling frequency of the scalar value s(x). Due to the non-linear characteristics of the attenuation coefficient, the Nyquist sampling frequency may raise dramatically. In order to solve the problem that the sampling frequency raises dramatically due to the non-linear characteristics of the transfer function, a pre-integration method is used. After the pre-integration method is used, it can rapidly be determined whether a block of CT data represents that the block is transparent.

Pre-integration primarily comprises two steps. The first step is to sample the continuous scalar field s(x) along the line-of-sight direction. In this step, the sampling frequency is not influenced by the transfer function. The second step is to perform volume rendering integration on a segment between each two sampling points by means of a lookup table.

After sampling of s(x) is complete, volume rendering integration is then performed on each segment. The integration process is completed by means of the lookup table. There are three parameters in the lookup table, including a start point of the segment $S_f = s(x(i \cdot d))$, an end point of the segment $S_b = s(x((i+1) \cdot d))$, and a length of the segment d. Assume that the length of the segment d is a constant, only two parameters $S_f$ and $S_b$ need to be considered during calculation by means of the lookup table.

The opaqueness of the i-th segment may be represented as:

$$\alpha_i = 1 - \exp\left(-\int_{id}^{(i+1)d} \tau(s(x(\lambda)))d\lambda\right) \quad (1)$$

$$\approx 1 - \exp\left(-\int_0^1 d \cdot \tau((1-\omega)s_f + \omega s_b)d\omega\right)$$

An integration function is introduced into the above equation for acceleration, and then the opaqueness $\alpha = \alpha(s_f, s_b)$ may be rewritten as:

$$\alpha_i \approx 1 - \exp\left(-\int_0^1 d \cdot \tau((1-\omega)s_f + \omega s_b)d\omega\right) \quad (2)$$

$$= 1 - \exp\left(-\frac{d}{s_b - s_f}\int_{s_f}^{s_b} \tau(s)ds\right)$$

$$= 1 - \exp\left(-\frac{d}{s_b - s_f}(T(s_b) - T(s_f))\right)$$

wherein $T(s) = \int_0^s \tau(s')ds'$.

2) Removal of Transparent Region Based on Octree

Figure 5:
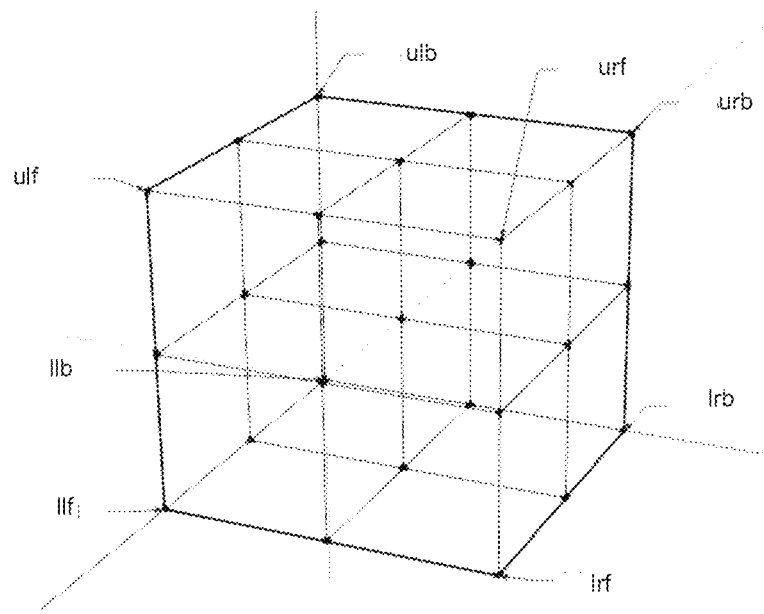
FIG. 5 is a schematic diagram illustrating an octree subdivision algorithm.

Octree is a tree-like data structure for describing a 3D space. FIG. 5 is a schematic diagram illustrating an octree subdivision algorithm. Each node of the octree represents a volume element of a cube. Each node has 8 sub-nodes, and a sum of all volume elements represented by the 8 sub-nodes is equal to the volume of the parent node. The octree illustrated in FIG. 5 includes 8 nodes, ulf, urf, ulb, urb, llf, lrf, llb and lrb. When the spatial data is subdivided using the octree encoding algorithm, assume that a body V to be represented can be placed in a large enough cube C, and then the octree of the body V relative to the cube C may be defined in the following recursive way. Each node of the octree corresponds to a sub-cube of C, and a root node of the octree corresponds to C itself. If V=C, the octree of V has only the tree node; and if V≠C, then C is equally divided into 8 sub-cubes, each sub-cube corresponding to a sub-node of the root node. If a sub-cube is not completely empty or is not completely occupied by V, then the sub-cube is further equally divided into 8 parts, and thus the corresponding node has 8 sub-nodes. The recursive judgment and division are carried out until a cube corresponding to a node is completely empty, or is completely occupied by V, or has a size equal to a predefined size of a sub-cube.

The volume data is subdivided level-wise according to a predefined size of a leaf node. When the data field is traversed, a maximum $s_{max}$ and a minimum $s_{min}$ of all voxels in a sub-block corresponding to a leaf node, an axial bounding box corresponding to the sub-box and a volume value thereof are statistically calculated. Then, the nodes are upward combined level-wise to construct the octree. A diagram of the octree subdivision is shown in FIG. 5.

Figure 6:
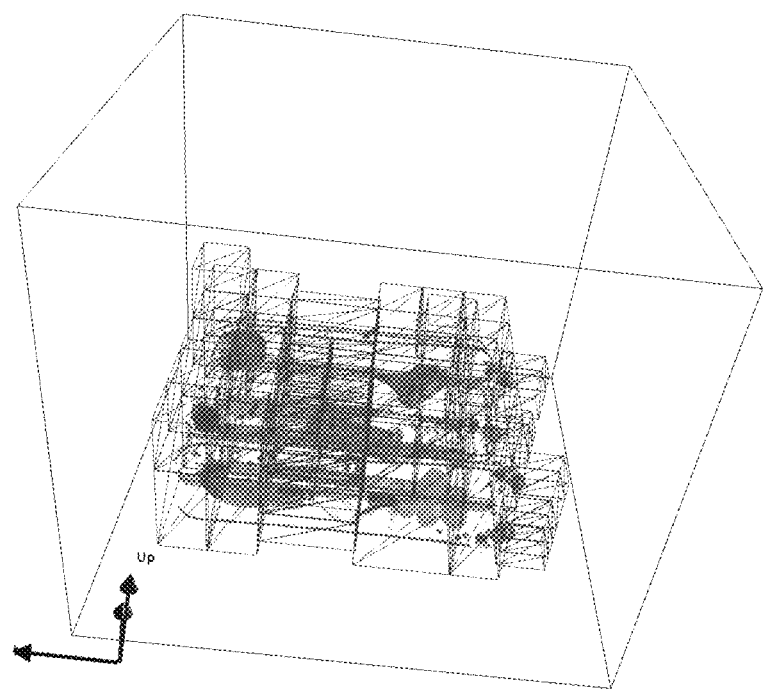
FIG. 6 is a diagram illustrating a hierarchical bounding box obtained by using an octree subdivision algorithm according to an embodiment of the present disclosure.

According to the embodiment of the present disclosure, the octree is traversed to recursively set a visibility state of each node at each level. For a non-leaf node, the state may be transparent, partially transparent or opaque. The state of the node is decided by states of sub-nodes included in the node. If all the sub-nodes are transparent, the current node is transparent; if all the sub-nodes are opaque, the current node is opaque; and if a part of the sub-nodes are transparent, the current node is semitransparent. For the leaf node, the state can be only transparent or opaque. The visibility state of the leaf node is obtained by query of opaqueness. Specifically, when an octree is constructed, minimal and maximal gray level values ($s_{min}, s_{max}$) of each sub-block have been stored, and the opaqueness α of the current sub-block is rapidly obtained using the above opaqueness query function $\alpha(s_f, s_b)$. If $\alpha \geq \alpha_{68}$, the current leaf node is opaque, wherein $\alpha_\epsilon$ is a predefined threshold of the opaqueness. As shown in FIG. 6, illustrated are remaining opaque parts after the transparent blocks are removed, wherein the large cubic block represents the size indicated by the original data.

Figure 7:
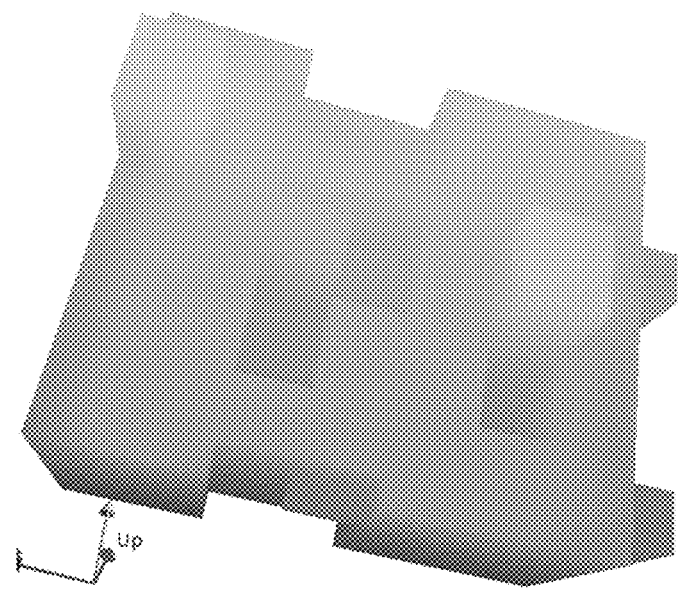
FIG. 7 is a diagram illustrating a depth map on the front side according to an embodiment of the present disclosure.
Figure 8:
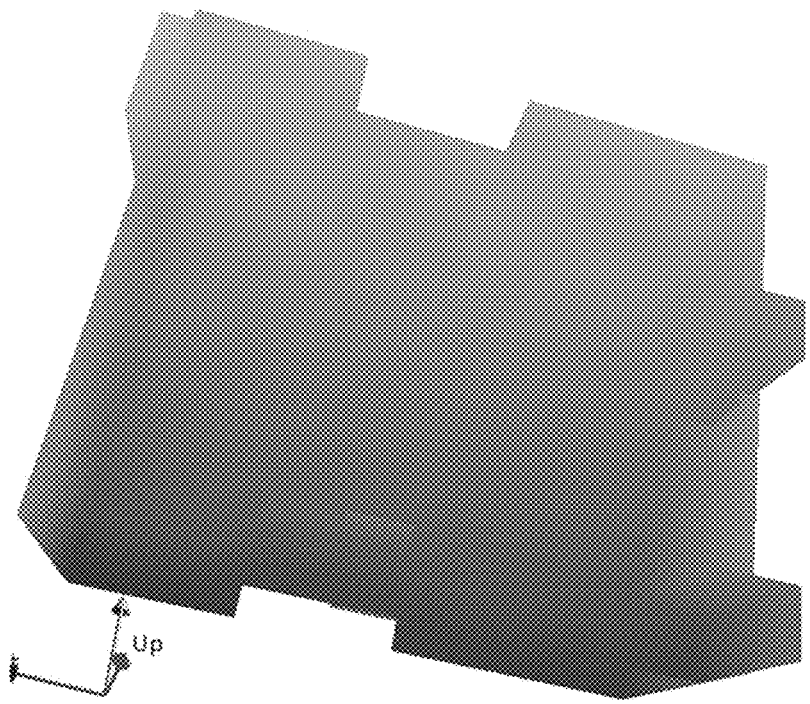
FIG. 8 is a diagram illustrating a depth map on the back side according to an embodiment of the present disclosure.

In step S412, a scene depth is rendered for the hierarchical bounding box, to obtain a depth map on the front side and a depth map on the back side. In step S413, retrieval is performed in the depth map on the front side and the depth map on the back side respectively using marks made by the user in the line-of-sight direction, to generate a first bounding box. FIG. 7 is a diagram illustrating a depth map on the front side according to an embodiment of the present disclosure. FIG. 8 is a diagram illustrating a depth map on the back side according to an embodiment of the present disclosure.

In the volume rendering, a 3D mode is needed to be used as a volume texture carrier, and then the volume texture is mapped to the model by texture coordinates. Then, a ray is led from a viewpoint to a point on the model. The ray passing though the model space is equivalent to the ray passing though the volume texture. In this way, determination of the incident and emergent positions of the cast ray is converted into a problem of solving intersection of the ray with the volume texture carrier. As shown in FIG. 7, a depth map on the front side is obtained by rendering a scene depth map for the hierarchical bounding box obtained above and then removing sections with relatively great depth values from the rendered scene depth map, wherein a color value of each pixel on the depth map on the front side represents a distance from the viewpoint to a point closest to the viewpoint in a certain direction. As shown in FIG. 8, a depth map on the back side is obtained by rendering a scene depth map for the hierarchical bounding box obtained above and then removing sections with relatively small depth values from the rendered scene depth map, wherein a color value of each pixel on the depth map on the back side represents a distance from the viewpoint to a point farthest to the viewpoint in a certain direction.

Figure 9:
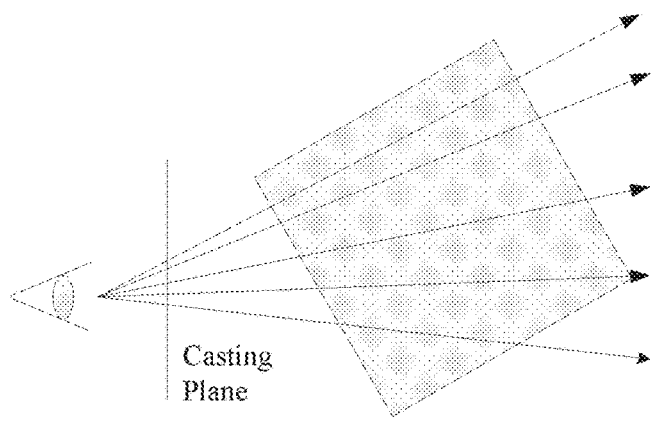
FIG. 9 is a diagram illustrating a ray casting process according to an embodiment of the present disclosure.

FIG. 9 is a diagram illustrating a ray casting process according to an embodiment of the present disclosure. The basic ray casting process is as follows. Specifically, a ray is emitted from each pixel of the image along a fixed direction, and then passes through the whole image sequence. In this process, the image sequence is sampled and classified to obtain color values. The color values are accumulated according to a ray absorption model, until the ray passes through the whole image sequence. The color value which is finally obtained is the color of the rendered image. The casting plane illustrated in FIG. 9 is the above "image."

Figure 10:
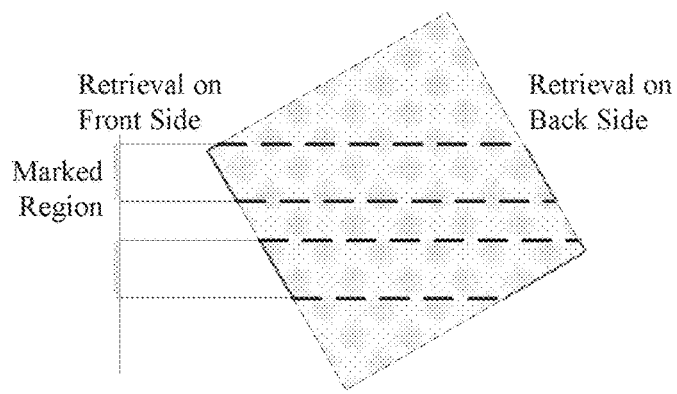
FIG. 10 is a diagram illustrating marks made by a user according to an embodiment of the present disclosure.
Figure 11:
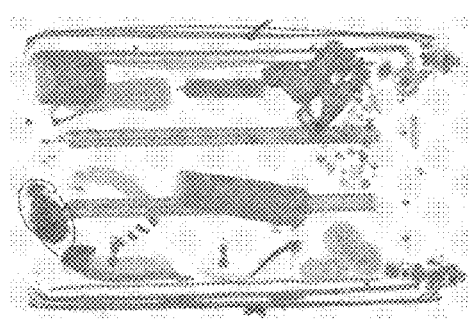
FIG. 11 is a diagram illustrating a process of retrieval on the front side and the back side using marks from a user.
Figure 12:
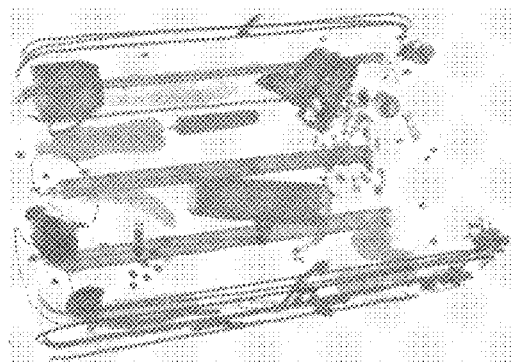
FIG. 12 is a diagram illustrating a result obtained by retrieval on the front side and the back side according to an embodiment of the present disclosure.

Finally, a 2D picture is obtained by the ray casting, and thus the depth information of the voxels through which the pixel cast ray passes cannot be restored. In order to complete region pickup of the voxel space, as shown in FIG. 10, a suspected region is marked on the casting plane, and the marked result is shown in FIG. 11. In order to restore the depth information in the voxel space from the marked result, the marked event is discretized into columns of points, and retrieval is performed in the depth map on the front side and the depth map on the back side respectively, to obtain a projection result of the marked region on the depth maps. FIG. 12 is a diagram illustrating a process of retrieval on the front side and the back side using marks of a user according to an embodiment of the present disclosure. In this case, one 2D mark operation on the screen image is restored to 3D marks in the voxel space.

After one mark operation is made, the range of the suspected region is still relatively large. In order to further trim the suspected region, it needs to calculate an OBB hierarchical bounding box corresponding to columns of marked points in the voxel space.

The basic idea of the bounding box method is to substitute a variety of complex geometries with simple geometries. Coarse detection is firstly performed on the bounding boxes of the object. Only when the bounding boxes are intersected, the geometries bounded by the bounding boxes can be intersected. When the bounding boxes are not intersected, the geometries bounded by the bounding boxes must be not intersected. In this way, a large number of geometries and geometrical parts which are impossible to be intersected can be excluded, so as to rapidly find the geometrical parts which are intersected. There are several types of bounding boxes, i.e., Axis-Aligned Bounding Box (AABB) along coordinate axes, bounding sphere, bounding box OBB along any direction, and more general k-dop bounding box. After envelope compactness and computational costs of the various bounding boxes are evaluated, the OBB bounding box is selected to calculate the columns of marked points. The key of calculation of the OBB bounding box is to find an optimal direction and determine a minimal size of the bounding box which bounds the object in the direction. The position and direction of the bounding box are calculated using statistics of first-order moment (mean value) and second-order moment (covariance matrix). Assume that a i-th vertex is $P^i$, and a number of vertexes bounded by the bounding box is n. The central position of the bounding box is as follows:

$$m = \frac{1}{n}\sum_{i=1}^{n} p^i \quad (3)$$

Assume that the covariance matrix is represented as:

$$C = \begin{bmatrix} C_{11} & C_{12} & C_{13} \\ C_{21} & C_{22} & C_{23} \\ C_{31} & C_{32} & C_{33} \end{bmatrix} \quad (4)$$

Elements of the covariance matrix are represented as:

$$C_{jk} = \frac{1}{n}\sum_{i=1}^{n} \overline{p_j^i p_k^i}, 1 \le j, k \le 3; \quad (5)$$

wherein $\overline{p^i} = p^i - m$ is a 3×1 vector, and $\overline{p^i} = (\overline{p_1^i}, \overline{p_2^i}, \overline{p_3^i})$.

Figure 13:
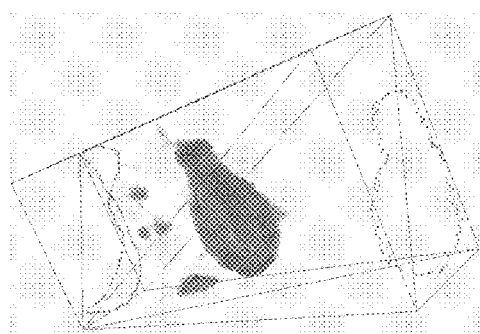
FIG. 13 is a diagram illustrating an Orientated Bounding Box (OBB) bounding box of columns of marked points according to an embodiment of the present disclosure.

Eigenvectors of the covariance matrix are solved by a numerical method and are unitized. As C is a real symmetric matrix, the eigenvectors of the matrix C are orthogonal to each other, and may be used as direction axes of the bounding box. The vertexes of the geometry to be bounded are projected onto the direction axes, to find projective intervals on the respective direction axes. The lengths of the respective projective intervals commonly represent the size of the bounding box to be solved. FIG. 13 is a diagram illustrating an OBB bounding box of columns of marked points according to an embodiment of the present disclosure.

In step S414, ray is cast with the generated first bounding box as a texture carrier. In step S415, retrieval is performed in the depth map on the front side and the depth map on the back side respectively using marks made by the user along a direction orthogonal to the line of sight direction, to generate a second bounding box.

1) Updating of Ray Casting Range

Figure 14:
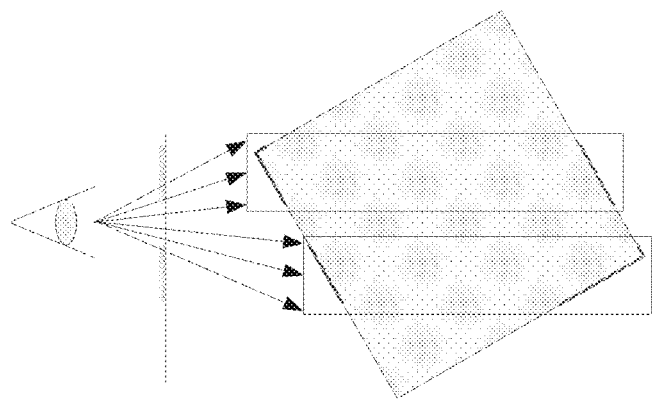
FIG. 14 is a diagram illustrating a new ray casting range updated on the basis of the previous mark result.

As shown in FIG. 14, after a range of the suspected region is determined, parts outside the region are removed from display, and ray is cast using the generated OBB bounding box as a new volume texture carrier.

2) Second Pickup After the Angle of View is Rotated

Figure 15:
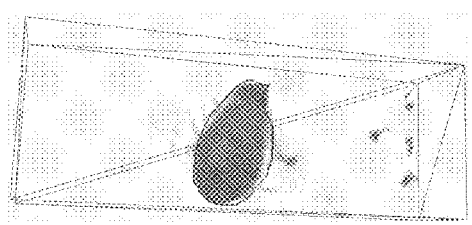
FIG. 15 is a diagram illustrating a result from making marks for the second time in an orthogonal direction according to an embodiment of the present disclosure.
Figure 16:
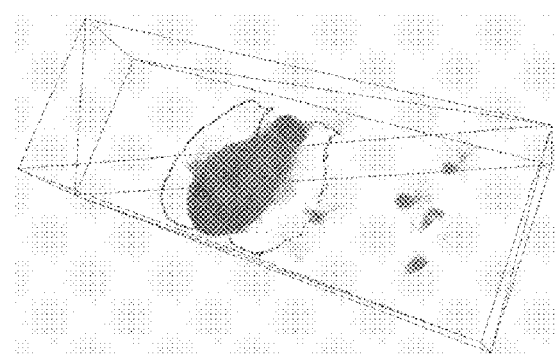
FIG. 16 illustrates a result obtained by retrieval on the front side and the back side using marks made for the second time according to an embodiment of the present disclosure.
Figure 17:
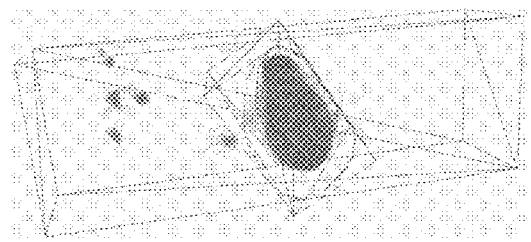
FIG. 17 is a diagram illustrating an OBB bounding box of columns of marked points according to an embodiment of the present disclosure.
Figure 18:
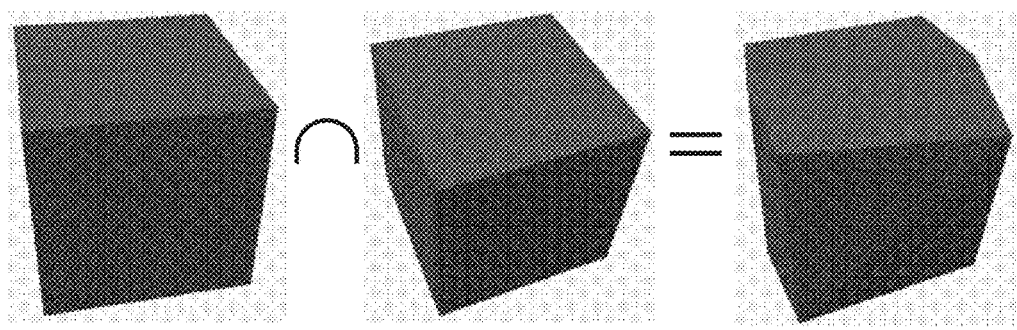
FIG. 18 is a diagram illustrating a process of performing a Boolean intersection operation on two objects in an image space according to an embodiment of the present disclosure.

FIG. 15 is a diagram illustrating a result from making marks for the second time in an orthogonal direction according to an embodiment of the present disclosure. FIG. 16 illustrates a result obtained by retrieval on the front side and the back side using marks made for the second time according to an embodiment of the present disclosure. FIG. 17 is a diagram illustrating an OBB bounding box of columns of marked points according to an embodiment of the present disclosure. In step S416, a Boolean intersection operation is performed on the first bounding box and the second bounding box in the image space, to obtain a marked region in the 3D space. FIG. 18 is a diagram illustrating a process of performing a Boolean intersection operation on two objects in the image space according to an embodiment of the present disclosure.

In order to accelerate the acquisition of the intersected region between two OBB bounding boxes, a Constructive Solid Geometry (CSG) method is used for calculation. A CSG model may be rendered using OpenGL in two directions. In one direction, the CSG model is rendered based on an object space. Specifically, the CSG model is directly converted into a set of polygons, and then is rendered using OpenGL. A typical method for this solution is to convert the CSG model into a B-rep model. However, the model conversion results in a low efficiency and is not convenient for dynamic modification. In the other direction, the CSG model is rendered based on an image space, which is used in the present disclosure.

An intersection operation is performed in the image space, without modifying the model, and the operation is performed dynamically for each frame to decide which surface(s) should be displayed and which surface(s) should be hidden or cut. The intersection operation in the CSG is achieved by using stencil buffer of the OpenGL. With the idea of ray casting, when a surface of an entity is projected onto a screen, a number of intersections of the pixels on the surface thereof with respect to other surfaces is calculated.

With the above operations, two cubes have been obtained. Seeking intersections between the two cubes is substantially to find parts of a surface of one cube in the volume of the other cube. In the process of seeking interactions, a front surface and a back surface of any specified component entity are rendered respectively in respective channels. Specifically, in each rendering process, a current surface is firstly rendered into a depth buffer, and then parts of the current surface in other entities are decided by using the other entities in combination with a stencil plane operation.

Figure 19:
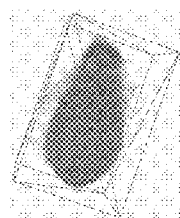
FIG. 19 is a diagram illustrating a finally obtained 3D marked region of a suspected object according to an embodiment of the present disclosure.

Here, it is judged wither a point is in a given entity space using parity check. Theoretically, it can be judged whether any point in the space is in a given volume by parity check. However, because the depth buffer of the OpenGL can store only one depth value for each pixel point, the parity check process of rendering the intersection between entity A and entity B is as follows. Firstly, parts of A in B are found and rendered, and then parts of B in A are found and rendered. At this time, the front side of A in B has been rendered. In order to obtain the front side of B in A, pixels in the depth buffer which are covered by the front side of B are firstly re-rendered. This is because all parts of A have been in the depth buffer after the above operations, and parts of A outside B may shield parts of B which should be visible. After the depth values of B are corrected in the depth buffer, the parts of the front side of B in A are found and rendered in the similar manner as above, and the description thereof will be omitted here. FIG. 19 is a diagram illustrating a finally obtained 3D marked region of a suspected object according to an embodiment of the present disclosure.

Figure 20:
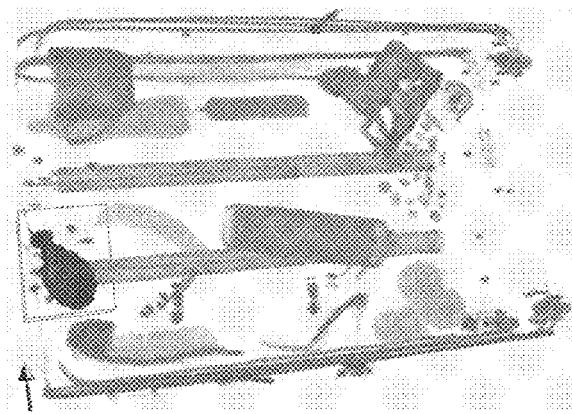
FIG. 20 is a diagram illustrating display of a marked suspected object in combination with original data according to an embodiment of the present disclosure.

In step S417, the marked region in the 3D space is merged in and displayed together with the CT data. For example, after the picked up suspected region is obtained, it needs to merge the suspected region in the original data and display the suspected region together with the original data with a higher visible priority. It can be seen from FIG. 18 that the final suspected region may not be in a regular cuboid shape. The space constraint based transfer function is used here. A one-dimensional lookup texture is generated according to the dimension of the volume data using a scan line algorithm, and each texel stores information concerning whether a corresponding spatial position is in the bounding box of the suspected region. The final merged rendering effect is shown in FIG. 20.

In addition, when the TIP is inserted into the CT data, it should be ensured that not only the inserted TIP is in the range of the cases, but also the inserted image does not cover the original objects in the cases. Further, the real-time requirement for the algorithm is also an important factor to be considered. According to some embodiments, transparent regions and opaque regions of the volume data are determined according to the opacity, and parts of the empty regions of the cases, whose volumes meet the requirements, are selected as candidate insertion positions, and an insertion position with a specified concealment level is finally selected according to the distance from the position to the view plane and a number of objects around the position.

For example, a lookup table for pre-integration is generated based on opacity to rapidly determine the transparent regions and non-transparent regions of the volume data. Then, an opaque octree is constructed for the volume data, to determine the positions and sizes of the cases in the CT data. Then, a transparent octree is constructed for the volume data, to obtain regions in the cases available for insertion, wherein the transparent octree only statistically calculates transparent parts in the data region and completely excludes opaque parts. Parts of the transparent regions whose volumes meet insertion requirements are selected as candidate insertion positions. A final insertion position is determined according to the specified insertion concealment level.

With the solutions disclosed herein, the FTI can be rapidly inserted into the CT data, and it can be ensured that the insertion position is in the cases while the inserted image does not cover the original objects in the cases. The insertion concealment level may be set by parameter(s), and the real-time performance of the algorithm can be ensured.

The foregoing detailed description has set forth various embodiments of the method and apparatus for marking a suspected object in a security check CT system using diagrams, flowcharts, and/or examples. In a case where such a diagram, flowchart, and/or example includes one or more functionalities and/or operations, it will be understood by those skilled in the art that each functionality and/or operation in the diagram, flowchart or example may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuit (ASIC), Field Programmable Gate Array (FPGA), Digital Signal Processor (DSP), or in other integrated formats. However, those skilled in the art will appreciate that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing circuitries and/or writing codes for the software and/or firmware would be well within the skill of those skilled in the art in light of this disclosure. In addition, those skilled in the art will appreciate that the mechanisms of the subject matter described herein can be distributed as a program product in a variety of forms, and that illustrative embodiments of the subject matter described herein apply regardless of particular types of signal carrying media used to actually carry out the distribution. Examples of the signal carrying media include, but are not limited to, recordable media such as floppy disk, hard disk drive, Compact Disc (CD), Digital Versatile Disk (DVD), digital magnetic tape, computer memory, or the like, and transmission media such as digital and/or analog communication media (e.g., fiber cable, waveguide, wired communication link, wireless communication link, or the like).

While the present disclosure has been described with reference to several embodiments, it is apparent to those skilled in the art that the terms are used for illustration and explanation purpose and not for limitation. The technology disclosed herein may be implemented in various forms without departing from the spirit or essence of the present disclosure. It should be understood that the embodiments are not limited by any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A method in a Computed Tomography (CT) system for security check, comprising steps of:
reading inspection data of an inspected object;
inserting at least one previously collected three-dimensional (3D) Fictional Threat Image (FTI) into a 3D inspection image of the inspected object, wherein the 3D inspection image is obtained from the inspection data, and wherein even if the 3D FTI is blocked by a part of the inspected object at a certain angle of view, the 3D FTI can be observed by adjusting the 3D inspection image including 3D FTI to another angle of view;
receiving a selection of at least one region in the 3D inspection image including the 3D FTI or at least one region in a two-dimensional (2D) inspection image including a 2D FTI corresponding to the 3D FTI, wherein the 2D inspection image is obtained from the 3D inspection image or is obtained from the inspection data; and
providing a feedback of the 3D inspection image including at least one 3D FTI in response to the selection.

2. The method according to claim 1, wherein the step of receiving a selection of at least one region in the 3D inspection image including the 3D FTI or at least one region in a 2D inspection image including a 2D FTI corresponding to the 3D FTI comprises:
receiving coordinate positions of a part of the 3D inspection image or the 2D inspection image associated with the selection.

3. The method according to claim 1, wherein the step of providing a feedback of the 3D inspection image including at least one 3D FTI in response to the selection comprises at least one of:
judging whether the at least one selected region includes the at least one 3D FTI;
popping up a dialog to confirm that the 3D inspection image includes at least one 3D FTI;
providing text indication on an interface to confirm that the 3D inspection image includes at least one 3D FTI;
highlighting the part of the 3D inspection image or the 2D inspection image associated with the selection;
marking the part of the 3D inspection image or the 2D inspection image associated with the selection; and
filling the part of the 3D inspection image or the 2D inspection image associated with the selection with a particular color or pattern.

4. The method according to claim 1, wherein at least one spatial characteristic parameter of the inspected object is calculated according to the inspection data, and at least one 3D FTI is inserted into the 3D inspection image of the inspected object based on the spatial characteristic parameter.

5. The method according to claim 4, wherein the spatial characteristic parameter is related to at least one of position, size and orientation of the 3D FTI to be inserted.

6. The method according to claim 1, wherein selection of at least one region comprises selection of a part of the displayed 3D inspection image at an angle of view.

7. The method according to claim 6, wherein in 3D rendering of the 3D inspection image, point cloud information characterizing the inspected object is recorded, and the step of providing a feedback of the 3D inspection image including at least one 3D FTI in response to the selection comprises:
obtaining a sequence of point cloud information clusters of different objects in the inspected object by division;
determining at least one selected region from the sequence of point cloud information clusters of the different objects based on a predetermined criterion; and
judging whether the at least one selected region includes the at least one 3D FTI.

8. The method according to claim 1, wherein selection of at least one region comprises selection of a part of the displayed 3D inspection image at multiple angles of view.

9. The method according to claim 8, wherein selection of at least one region comprises selection of a part of the displayed 3D inspection image at two different angles of view, wherein the two different angles of view are substantially orthogonal to each other, transparent regions are removed from the inspection data to obtain a hierarchical bounding box of opaque regions in the inspection data, and then a scene depth is rendered for the hierarchical bounding box to obtain a depth map on the front side and a depth map on the back side, and the step of providing a feedback of the 3D inspection image including at least one 3D FTI in response to the selection comprises:
performing retrieval in the depth map on the front side and the depth map on the back side respectively according to a region selected by a user at a first angle of view to generate a first bounding box;
performing ray casting with the generated first bounding box as a texture carrier;
performing retrieval in the depth map on the front side and the depth map on the back side respectively according to a region selected by the user at a second angle of view substantially orthogonal to the first angle of view, to generate a second bounding box;
performing a Boolean intersection operation on the first bounding box and the second bounding box in an image space, to obtain a marked region in a 3D space as at least one selected region; and
judging whether the at least one selected region includes the at least one 3D FTI.

10. The method according to claim 1, wherein, the step of inserting at least one 3D FTI into a 3D inspection image of the inspected object comprises:
dividing the 3D inspection image to obtain multiple 3D sub-images of the inspected object;
calculating distances between and positions of the multiple 3D sub-images; and
inserting the 3D FTI based on the calculated distances and positions.

11. The method according to claim 1, wherein the step of inserting at least one 3D FTI into a 3D inspection image of the inspected object comprises:
determining transparent parts and opaque parts in volume data of the inspected object based on opacity values of voxels;
determining positions and sizes of cases of the inspected object from the opaque parts of the volume data;

determining candidate insertion positions in transparent regions in the range of the cases; and selecting at least one position from the candidate insertion positions according to a predetermined criterion to insert at least one 3D FTI into the at least one selected position.

12. The method according to claim 1, wherein the step of inserting at least one 3D FTI into a 3D inspection image of the inspected object comprises:

removing a background image from the 2D inspection image, to obtain a 2D foreground image;

determining a 2D insertion position of a 2D FTI in the 2D foreground image;

determining a position of a 3D FTI in the 3D inspection image along a depth direction at the 2D insertion position; and inserting at least one 3D FTI into the determined position.

13. The method according to claim 1, further comprising: inserting a 2D FTI corresponding to the at least one 3D FTI into the 2D inspection image of the inspected object.

14. A Computed Tomography (CT) system for security check, comprising:

a CT scanning device configured to obtain inspection data of an inspected object;

a storage configured to store the inspection data;

a display device configured to display a three-dimensional (3D) inspection image and/or two-dimensional (2D) inspection image of the inspected object, wherein the 3D inspection image is obtained from the inspection data, and the 2D inspection image is obtained from the 3D inspection image or the inspection data and wherein even if the 3D FTI is blocked by a part of the inspected object at a certain angle of view, the 3D FTI can be observed by adjusting the 3D inspection image including 3D FTI to another angle of view;

a data processor configured to insert at least one previously collected 3D Fictional Threat Image (FTI) into the 3D inspection image of the inspected object; and an input device configured to receive a selection of at least one region in the 3D inspection image including the 3D FTI or at least one region in the 2D inspection image including a 2D FTI corresponding to the 3D FTI, wherein the data processor is further configured to provide a feedback of the 3D inspection image including at least one 3D FTI in response to the selection.

15. The CT system for security check according to claim 14, wherein the data processor is further configured to calculate at least one spatial characteristic parameter of the inspected object according to the inspection data, and insert at least one 3D FTI into the 3D inspection image of the inspected object based on the spatial characteristic parameter.

16. The CT system for security check according to claim 14, wherein the spatial characteristic parameter is related to at least one of position, size and orientation of the 3D FTI to be inserted.

* * * * *